United States Patent [19]

Van Anrooy

[11] 4,072,362

[45] Feb. 7, 1978

[54] TRAILER BRAKE SYSTEM

[75] Inventor: John A. Van Anrooy, St. Joseph, Mich.

[73] Assignee: Lambert Brake Corporation, St. Joseph, Mich.

[21] Appl. No.: 696,048

[22] Filed: June 14, 1976

[51] Int. Cl.² .............................................. B60T 13/68
[52] U.S. Cl. ............................................ 303/7; 303/15
[58] Field of Search ................. 188/3 R; 303/7, 9, 12, 303/15

[56] References Cited

U.S. PATENT DOCUMENTS

| | | | |
|---|---|---|---|
| 2,142,514 | 1/1939 | Jones | 303/12 UX |
| 2,957,728 | 10/1960 | Hill | 303/12 X |
| 3,350,142 | 10/1967 | Schuman | 303/20 X |
| 3,768,870 | 10/1973 | Howard | 188/3 R X |

Primary Examiner—Duane A. Reger
Attorney, Agent, or Firm—Olson, Trexler, Wolters, Bushnell & Fosse, Ltd.

[57] ABSTRACT

A brake system for a towing vehicle and trailer is disclosed. An electromechanical transducer controller connected to the towing vehicle brake system develops an electrical signal which varies continuously and systematically in accordance with braking action pressure in the towing vehicle brake system. In a fluid trailer brake system, an electromechanical control receives this signal, and continuously and systematically varies the fluid pressure in the trailer brake system accordingly. A vacuum or other fluid power booster can be included to assist in amplifying and applying this fluid brake pressure. Trailer braking action in caliper-type trailer disc brakes varies in accordance with this fluid pressure.

36 Claims, 3 Drawing Figures

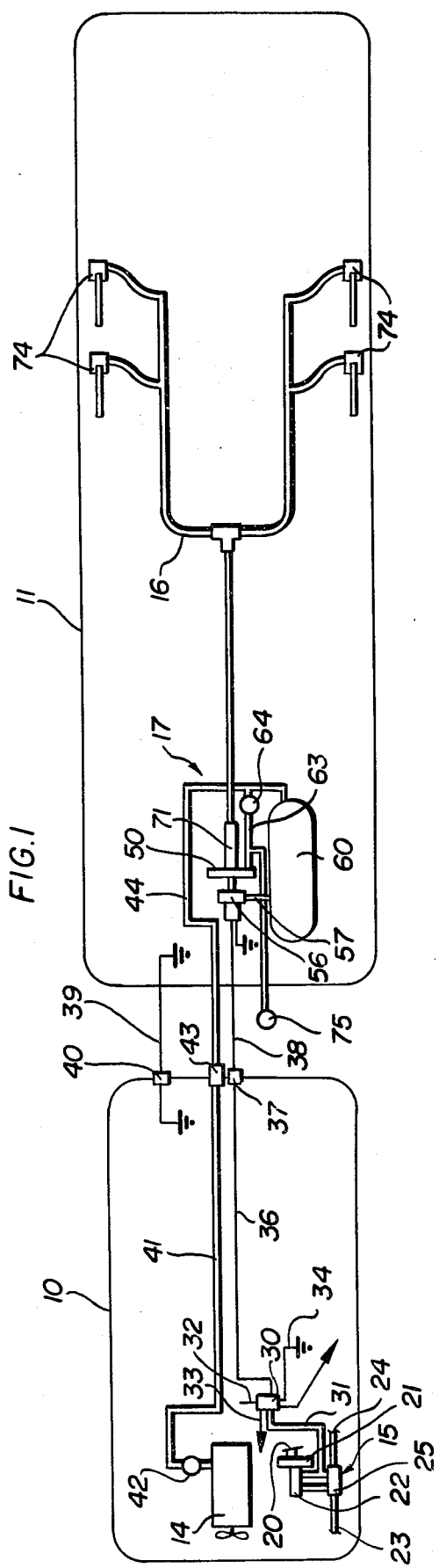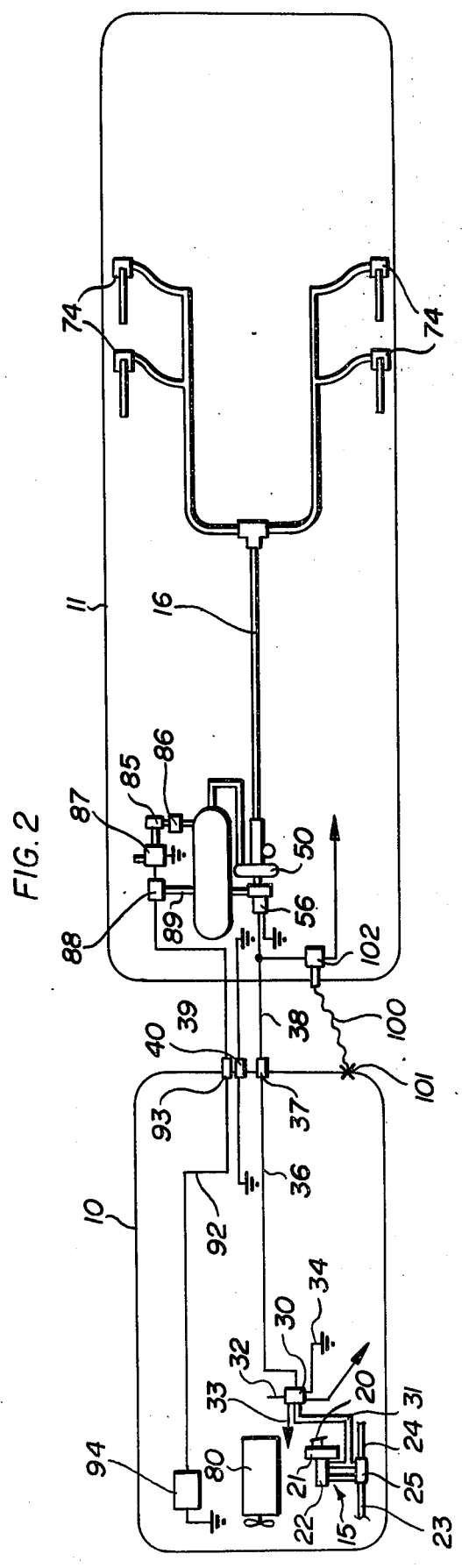

TRAILER BRAKE SYSTEM

BACKGROUND OF THE INVENTION

This invention relates generally to brake systems for towing vehicle and trailer combinations.

The manufacture, sale and use of towed recreational vehicles of the camping or mobile home variety has accelerated at a rapid rate. These trailers must of course be provided with effective brakes adapted for operation in conjunction with the towing vehicle brakes. Many presently offered towing vehicle-trailer braking systems provide high degrees of reliability and control.

The general object of the present invention is to provide a braking system for a trailer which further improves braking control of a towed and towing vehicle combination.

A more specific object is to provide such a towing vehicle-trailer braking system which offers improved brake balance, braking control reliability, and stopping ability under all normally encountered braking conditions with all normally available combinations of towing and towed vehicles. A related object is to offer a consequent increase in confidence level to the towing vehicle driver.

Another object is to provide such a system which requires but relatively few major components, which can be relatively quickly and easily installed, and which can be offered at relatively low cost.

Yet another object is to provide such a braking system which can be utilized with trailer brakes of the hydraulic caliper disc type. An associated object is to provide such a system which minimizes or eliminates entirely the phenomena of brake fade during heavy brake usage such as can be encountered when slowing and stopping from high speed. Also minimized are related brake grab or premature lock-up.

Still another object is to provide a towing vehicle-trailer brake system which can be used by a wide variety of towing vehicles and a wide variety of trailers without noticeable differences in overall braking characteristics or differences in the braking performance as different combinations of towing vehicles and trailers are considered.

A further object of the invention is to provide a brake system of the type described which can be used with a vacuum over hydraulic or vacuum suspended trailer brake booster unit. An associated object is to provide such a system which can be easily adapted for use with either an air over hydraulic or hydraulic over hydraulic booster unit as well.

Still another object is to provide such a trailer brake system which will accommodate direct adaptation of an anti-skid control to the system.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a schematic diagram showing a novel brake system embodying the present invention;

FIG. 2 is a schematic diagram similar to FIG. 1 showing a modified version of the novel brake system.

DETAILED DESCRIPTION

Figure 3:
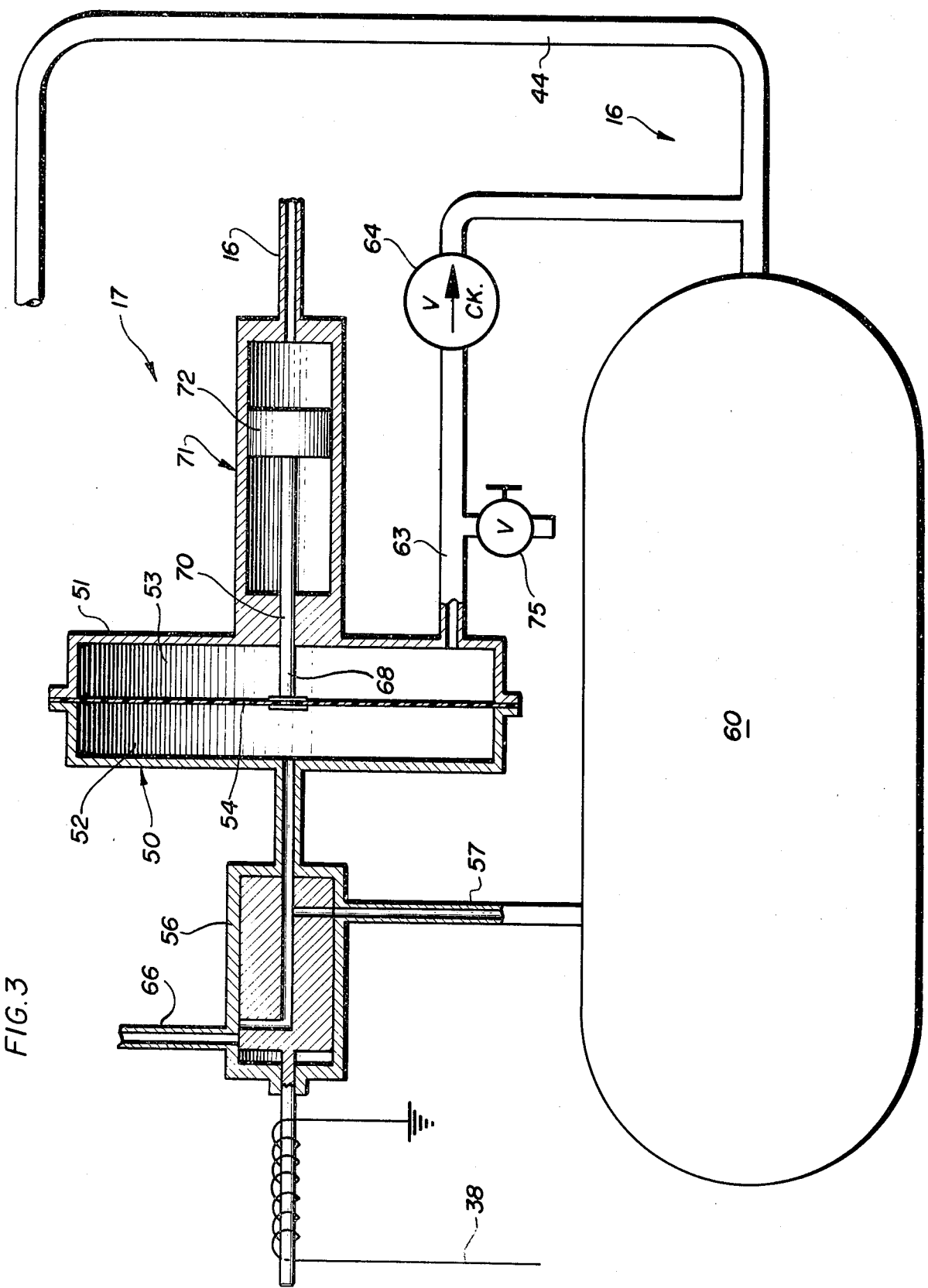
FIG. 3 is a schematic diagram of a trailer brake power unit, an associated trailer brake master cylinder, and related apparatus.

While the invention will be described in connection with preferred embodiments, it will be understood that it is not intended to limit the invention to these embodiments. On the contrary, it is intended to cover all alternatives, modifications and equivalents included within the spirit and scope of the invention and as defined by the appended claims.

Turning first to FIG. 1 there is shown, in schematic form, an embodiment of the present novel braking system in use with a towing vehicle 10 and towed trailer 11. In general, the towing vehicle 10 carries an engine 14 for propelling the towing vehicle 10 and the trailer 11. A towing vehicle brake system 15 selectively energizes associated brakes (not shown). Mounted within and upon the trailer 11 is a trailer fluid brake system 16, and a control 17 mounted in and upon the trailer 11 which energizes and controls the trailer fluid brake system 16.

More specifically, when a driver of the towing vehicle 10 desires to retard its progress, he depresses a brake pedal 20 in well known manner. If the brakes on the towing vehicle 10 are of the hydraulic variety, and are of the "power brake" type, a power booster 21 is energized and actuates a hydraulic brake master cylinder 22. Appropriate hydraulic pressure is directed to towing vehicle rear wheel brakes through a hydraulic line 23, and to front wheel brakes through another line 24. Brake warning lights and other devices can be actuated through an appropriate switch 25.

An electromechanical transducer control 30 mounted on the towing vehicle 10 is energized by increased hydraulic pressure through an interconnector line 31. To provide a smooth infinitely controllable braking action to the trailer 11 in accordance with the invention, this controller 30 modulates the towing vehicle hydraulic brake system brake pressure, and provides a correspondingly modulated electrical signal which varies systematically in accordance with fluid pressure experienced in the towing vehicle brake system interconnector line 31. A manual override switch 32 can be included if desired to operate the trailer braking system 16 directly from the towing vehicle 10. Appropriate electrical lines 33 and 34 connect the controller 30 to the towing vehicle electrical system battery or engine-driven generator, and to the system electrical ground, respectively. The electrical signal is transmitted by the controller 30 along appropriate wiring 36 through a quick-disconnect plug 37 and trailer wiring 38 to the trailer brake controller 17 mounted upon the trailer 11. To maintain a common electrical ground, a wire 39 electrically interconnects appropriate grounding members of the trailer 11 and towing vehicle 10 through a ground wire interconnect plug 40.

The braking system illustrated in FIG. 1 is of the vacuum system variety, and a vacuum conduit or hose line 41 provides a vacuum drawn through an intake manifold of the engine 14 in well known manner. A check valve 42 prevents vacuum loss in the system when the engine 14 is not operating. Vacuum drawn from the trailer controller 17 is rotated through the hose disconnect device 43 and trailer conduit 44.

As explained above, the trailer-mounted electromechanical brake control 17 systematically and infinitely varies, over a given range, fluid pressure and consequent braking action in the trailer brake system 16, in accordance with the sensed variation of the electrical signal transmitted by the controller 30. This braking action is provided by a trailer brake power booster unit 50.

As illustrated in FIG. 3, the power booster unit 50 includes a power can 51 in which are defined two power chambers 52, and 53, divided by a flexible diaphragm 54. When an electrical signal is applied through electrical wiring 36 and 38 as described above, a valve 56 positioned to permit air to be exhausted from one of these chambers 52 through a stub line 57 into a vacuum supply chamber 60. This supply tank 60 accommodates repeated braking action or surges in trailer brake vacuum demand. Air entering the vacuum supply tank 60 is drawn off by the vacuum conduit 44. Simultaneously, air is drawn from the second power can chamber 53 through a connector line 63 and safety check valve 64 to the vacuum conduit 44. The check valve 64 serves to prevent vacuum loss in the second chamber 53 in the event of inadvertent vacuum conduit parting or other system failure.

Appropriate alteration of the electrical signal in the electrical wiring 38 repositions the valve 56 to close off the vacuum stub line 57 and open an air inlet port or line 66 so as to admit air into the first power can chamber 52. When this occurs, the diaphragm 54 moves (to the right as shown in FIG. 3) and correspondingly moves an interconnector 68. This interconnector 68 forms part of or is attached to a piston rod 70 extending from a trailer hydraulic master brake cylinder 71. Movement of the piston rod 70 causes corresponding motion of the piston 72 and consequent increase or decrease in hydraulic pressure within the trailer system brake line 16. Changes in this brake system hydraulic pressure serves to operate the trailer brakes 74, which here are of the hydraulic disc type.

A manually operated brake release valve 75 is provided to admit ambient-pressure air into the second power can chamber 53 so as to move the diaphragm in a direction causing brake release when desired. This valve thus permits the trailer brakes to be released for repositioning or other trailer movement of a limited nature even though the trailer may be disconnected from the towing unit.

A modified embodiment of the invention is shown in FIG. 2, and is especially adapted for use in towing vehicles 10 which are provided with a diesel engine 80, or some other type which does not provide a vacuum source. In addition, the embodiment illustrated in FIG. 2 can be used for any other installation where it is believed undesirable to utilize a vacuum created by the power plant 80. Here, depressing the towing vehicle brake pedal 20 actuates the transducer 30 as described above. However, an electrically driven vacuum supply pump 85 is mounted upon the trailer 11, and exhausts the vacuum supply tank 60 through a normally closed check valve 86. This pump 85 is driven by an appropriate motor 87; the motor 87 is, in turn, energized when necessary by a low pressure vacuum switch 88 which senses vacuum in the tank 60 through a tap line 89. Power is supplied to both the switch 88 and the motor 87 through an appropriate electrical line 92 and breakaway plug 93 from a battery/generator or alternator combination 94 mounted upon the towing vehicle 10. An appropriate breakaway cable 100 secured at one end 101 to the towing vehicle 10 can be used to energize an electric breakaway switch 102 so as to operate the solenoid valve 56 in the event of inadvertent physical disconnection of the towing vehicle 10 from the trailer 11.

When the breakaway switch 102 operates the solenoid valve 56, air is admitted into the power can 50 to apply the trailer brakes 74, as described above.

The invention is claimed as follows:

1. A brake system for a towing vehicle and trailer, comprising a towing vehicle fluid brake system, an electromechanical transducer connected to the towing vehicle fluid brake system for developing an electrical signal which varies proportionately in accordance with fluid pressure experienced in the towing vehicle brake system, a trailer fluid brake system, and an electromechanical control electrically connected to he transducer for proportionately varying the fluid pressure and consequent braking action in the trailer brake system in accordance with the variation in the electrical signal, said control including a power booster having an unported diaphragm between two chambers defined within the power booster, a diaphragm interconnector interposed between the diaphragm and said trailer fluid brake system, valve means responsive to said electrical signal for altering pressure in one of the power booster chambers, relative to the other chamber, so as to move the diaphragm interconnector means and vary the fluid pressure in and resultant braking action of the trailer brake system in accordance with diaphragm movement.

2. A brake system according to claim 1 including a fluid pressure supply means for creating a given absolute fluid pressure in the power booster chambers.

3. A brake system according to claim 2 including safety valve means for altering the fluid pressure in one power booster chamber relative to the other chamber and resultant braking action in the trailer braking system in response to a fluid pressure failure in the fluid pressure supply means.

4. A brake system according to claim 2 wherein said fluid pressure supply means includes a fluid pressure pump, and a fluid pressure-accommodating supply tank, the supply tank being mounted on said trailer for maintaining the absolute fluid pressure created in at least one power booster chamber.

5. A brake system according to claim 4 wherein said fluid pressure pump is mounted on said towing vehicle, and including fluid pressure conduit means connecting the towing vehicle pump and the trailer-mounted supply tank.

6. A brake system according to claim 5 including quick disconnect means for disconnecting the fluid pressure conduit means at a point intermediate said fluid pressure supply tank.

7. A brake system according to claim 1 wherein said valve means include solenoid means producing a mechanical movement in response to said electrical signal, and a valve member movably connected to the solenoid means for opening and closing motion in response to the solenoid means mechanical movement for altering the absolute fluid pressure in one of the power booster chambers.

8. A brake system according to claim 7 wherein said two power booster chambers are normally maintained at relatively equalized absolute fluid pressures, and wherein said valve member operates to admit a fluid into one of said chamber so as to unequalize the fluid pressure on the diaphragm and operate the trailer braking system.

9. A brake system according to claim 8 including a selectively operable brake release valve connected to the other of said power booster chambers so as to admit a fluid into said other chamber so as to unequalize the absolute pressure on the diaphragm and release the trailer braking system for further braking action.

10. A brake system according to claim 1 wherein said trailer brake system includes master cylinder means mechanically linked to said power booster diaphragm, movement of the diaphragm varying brake fluid pressure in the trailer braking system proportionally to brake fluid pressure in said towing vehicle brake system.

11. A brake system according to claim 1 including manually operated override means for actuating the trailer brake system braking action regardless of towing vehicle brake system actuation or transducer-developed electrical signals.

12. A brake system according to claim 1 wherein said electromechanical transducer includes means for systematically varying the electrical signal continuously and infinitely over a given range, and wherein said electromechanical control includes means for systematically varying the trailer brake system fluid pressure and consequent braking action in a continuous and infinitely variable manner over a given range in accordance with the electrical signal.

13. A brake system according to claim 1 wherein said trailer fluid brake system includes disc brakes responsive to fluid pressure in the trailer brake system to retard rotation of trailer wheels.

14. A brake system for a towing vehicle and a trailer, comprising, in combination, a towing vehicle brake system, actuator means for selectively operating the towing vehicle brake system, transducer means connected to the actuator means for developing an electrical signal which varies proportionately to towing vehicle brake system actuation, a trailer fluid brake system and an electromechanical fluid power control electrically connected to the transducer means and mechanically connected to the trailer fluid brake system for varying the trailer brake system fluid pressure and consequent trailer brake system braking action proportionately to the electrical signal, said power control including a power booster having an unported diaphragm between two fluid power chamber defined within the power booster, a diaphragm interconnector interposed between the diaphragm and said trailer fluid brake system, and valve means responsive to said electrical signal for altering pressure in one of the power booster chambers so as to move the diaphragm and vary the trailer brake system braking action accordingly.

15. A brake system according to claim 14 including means for producing a vacuum in each of the power booster chambers.

16. A brake system according to claim 15 including brake release valve means for releasing the vacuum in that power booster chamber opposite the valved chamber for releasing the trailer brakes on demand.

17. A brake system according to claim 15 wherein said means for producing a vacuum in each of the power booster chamber comprises vacuum take-off means fitted to a towing vehicle engine intake manifold, and vacuum conduit means interconnecting the vacuum take-off means and said power booster chambers.

18. A brake system according to claim 15 wherein said means for producing a vacuum in each of the power booster chambers comprises vacuum pump means carried on the trailer for producing a vacuum in the power booster chambers.

19. A brake system according to claim 18 including power means for operating said vacuum pump.

20. A brake system according to claim 19 including external electrical supply means carried on said towing vehicle for supplying said power means with electrical power for operation.

21. A brake system according to claim 20 including electrical conduit means for transmitting the electrical power from the electrical supply means on the towing vehicle to said vacuum pump power means on said trailer.

22. A brake system according to claim 14 including safety means for actuating said valve means in the event of electrical disconnection of the trailer from the towing vehicle.

23. A brake system according to claim 14 including vacuum supply tank means functionally interposed between said valve means and said means for producing a vacuum in each power booster chamber.

24. A brake system according to claim 14 including safety means for activating the power control and energizing the trailer braking system in the event of trailer-towing vehicle disconnection.

25. A braking system according to claim 24 including brake release valve means for releasing the trailer brakes upon demand.

26. A brake system according to claim 14 wherein said electromechanical transducer includes means for systematically varying the electrical signal continuously and infinitely over a given range, and wherein said electromechanical control includes means for systematically varying the trailer brake system fluid pressure and consequent braking action in a continuous and infinitely variable manner over a given range in accordance with the electrical signal.

27. A brake system according to claim 14 wherein said trailer fluid brake system includes disc brakes responsive to fluid pressure in the trailer brake system to retard rotation of trailer wheels.

28. A brake system for towing vehicle and trailer, comprising a towing vehicle brake system, an electromechanical transducer connected to the towing vehicle brake system for developing an electrical signal which varies proportionately and systematically in accordance with braking action experienced in the towing vehicle brake system, a trailer fluid brake system, and an electromechanical control electrically connected to the transducer for proportionately and systematically varying the braking action in the trailer brake system in accordance with the variation in the electrical signal, said control including a power booster having an unported diaphragm between two chambers defined within the power booster, a diaphragm interconnector interposed between the diaphragm and said trailer fluid brake system, valve means responsive to said electrical signal for altering pressure in one of the power booster chambers relative to the other chamber so as to move the diaphragm interconnector means and vary the fluid pressure in and resultant braking action of the trailer brake system in accordance with diaphram movement.

29. A brake system according to claim 28 wherein said trailer fluid brake system includes disc brakes responsive to fluid pressure in the trailer brake system to retard rotation of trailer wheels.

30. A brake system for a towing vehicle and trailer, comprising a towing vehicle fluid brake system, an electromechanical transducer connected to the towing vehicle fluid brake system for developing an electrical signal which varies proportionately in accordance with fluid pressure experienced in the towing vehicle brake system, a trailer fluid brake system, a power booster for energizing the trailer brake system, continuously energized fluid pressure supply means for creating a given absolute fluid pressure in the power booster, and an electromagnetic control electrically connected to the transducer and mechanically connected to the power booster for proportionately varying the fluid pressure and consequent braking action in the trailer brake system in accordance with the variation in the electrical signal.

31. A brake system according to claim 30 wherein said power booster includes an unported diaphragm between two chambers defined within the power booster, a diaphragm interconnector interposed between the diaphragm and said trailer fluid brake system, and wherein said electromagnetic control includes valve means responsive to said electrical signal for altering pressure in one of the power booster chambers relative to the other chamber so as to move the diaphragm interconnector means and vary the fluid pressure in and resultant braking action of the trailer brake system in accordance with diaphragm movement.

32. A brake system according to claim 31 wherein said fluid pressure supply means includes a fluid pressure pump, and a fluid pressure-accommodating supply tank, the supply tank being mounted on said trailer for maintaining the absolute fluid pressure created in at least one power booster chamber.

33. A brake system according to claim 32 wherein said fluid pressure pump is mounted on said towing vehicle, and including fluid pressure conduit means connecting the towing vehicle pump and the trailer-mounted supply tank.

34. A brake system according to claim 31 wherein said two power booster chambers are normally maintained at relatively equalized absolute fluid pressures, and wherein said electromagnetic control operates to admit a fluid into one of said chambers so as to unequalize the fluid pressure on the diaphragm and operate the trailer braking system.

35. A brake system according to claim 34 including a selectively operable brake release valve connected to the other of said power booster chambers so as to admit a fluid into said other chamber so as to unequalize the absolute pressure on the diaphragm and release the trailer braking system for further braking action.

36. A brake system according to claim 30 wherein said trailer brake system includes master cylinder means mechanically linked to said power booster for consequent master cylinder energization to vary brake fluid pressure in the trailer braking system proportionally to brake fluid pressure in said towing vehicle brake system.

* * * * *